3,180,821
ALKALI TREATMENT OF OIL
Reinhold T. Pfeifer, Houston, Tex., assignor to Petrolite Corporation, Wilmington, Del., a corporation of Delaware
No Drawing. Filed Dec. 12, 1961, Ser. No. 158,900
4 Claims. (Cl. 208—263)

This invention relates to alkali treatment of hydrocarbon oil and more particularly provides an improved method for the treating of gas oil to obtain an exceptionally clear product having unusual color and oxidative stability.

Treating processes involving the use of relatively strong, aqueous alkali metal hydroxide solutions containing upwards of 35% by weight alkali metal hydroxide are being widely used to reduce sulfur content and to improve color, odor and oxidative stability, and inhibitor response of gas oil fractions, particularly catalytically cracked gas oil fractions. The alkali treatment removes, along with mercaptans, acidic organic materials (sometimes described as acid oils) including various phenols and cresols and other alkyl phenols. The oil-soluble alkyl phenols and other organic acids react with strong caustic to form oil-insoluble products which are thus readily separable from the oil phase. The acid oils are known to have a pronounced effect on color stability and their removal or substantial removal improves considerably the color stability of the oil.

In the practice of the concentrated alkali treatment the treating solution is usually recirculated, although the caustic treating solution may be used once and discarded. Recirculation of the caustic is generally favored in order to economize on the treating material as much as possible. A single pass caustic treatment requires considerably more supervision than the recycle operation if waste of caustic is to be avoided.

A typical alkali recirculation treatment involves mixing the gas oil with a concentrated caustic solution. The mixture is passed to a settling vessel which may be of an electrical precipitator type. The gas oil-caustic solution mixture in the settling vessel separates to form two or three phases, depending on the process being carried out, the upper phase in each instance being a separated oil requiring further treatment. In the three-phase operation the mixture separates to produce an upper layer of treated oil, a middle layer containing caustic and extracted organic salts, and a lower layer constituting the unspent caustic solution. The lower unspent caustic layer, and in some instances a portion of the middle layer, is recirculated, after addition of fresh caustic, to the inlet of the settling vessel where the recirculated material is mixed with a further amount of the oil being treated.

In both two-phase and three-phase conventional operations the treated oil of the upper layer is removed from the settling vessel and water washed, this being commonly achieved by mixing the wash water and oil in a mixer and introducing the mixture into a settler or into an electric treater where the wash water is separated from the oil product. The water wash is employed to remove from the treated oil the residual dispersed phase of the treating solution made up of aqueous caustic and dissolved organic salts. Such water washing has been found essential in the commercial operation of the above-described process, to provide a readily marketable product, and is universally practiced.

It has now been discovered that the customary water washing step used in the alkali treatment of oil may be dispensed with and the treated oil subjected to a super-dehydration treatment, wherein through an application of an intense physical force the dispersed phase of aqueous caustic and dissolved organic salts is caused to separate virtually completely from the treated oil. The separating force can best be induced in a highly effective electric treater wherein the caustic treated gas oil is subjected to the action of a high-voltage unidirectional electrostatic field of a voltage gradient of at least about 7 kv./inch. The physical force required for the separation of the dispersed phase from the treated oil may, in an alternative, be provided by subjecting the gas oil to a centrifugal force in excess of about 850 g's and preferably in excess of about 950 g's for a time sufficient to separate the oil and its dispersed phase virtually completely, for example, a centrifugal force of about 850–1000 g's or more for respective times of at least 30–10 minutes.

The improved process of the invention is especially suitable for the alkali treatment of catalytically cracked gas oil boiling in the range of about 425–675° F. to provide a product having exceptional color stability. This unexpected improvement in color stability is attributable to the elimination of all the residual dispersed material which contains salts of acidic organic materials removed from the gas oil product. The caustic treated oil issuing directly from the caustic settling vessel contains a dispersed phase made up of alkali metal phenolates, such as alkali metal cresylate, and other water soluble organic salts dissolved in a small amount of the aqueous caustic. When the oil containing the dispersed phase is washed with water in conventional processing, hydrolysis of some of the organic salts occurs, with the result that these salts are returned to their oil soluble acid form and are dissolved back into the oil phase, thereby being present to degrade the color stability of the oil.

In the process of the invention, the gas oil is mixed with an amount of strong aqueous solution of alkali metal hydroxide sufficient to react with the acidic organic materials of the oil and form salts therewith. The alkali metal hydroxide normally makes up about 35–50% of the aqueous solution by weight. The aqueous alkali solution is then separated from the oil, producing a body of treated oil containing a small residual dispersion of caustic and organic acid salts. The separated oil is subjected to a superdehydrating step as the sole treatment for removing the residual aqueous salts to produce treated oil of superior quality.

Another distinct improvement in the oil product produced by the process of the invention is the great reduction in haze point of the treated oil. In the conventional method of operation, the final water wash produces an oil which is not only saturated with water, but also contains a residual haze due to the presence of very finely divided water droplets. This produces an oil of poor marketability because of customer objection to its appearance as well as the deleterious effects of the water present, which can promote corrosion, plugging of fuel jets and other undesirable results. A caustic treated gas oil which has been water washed will usually have a clarity of 65 to 95, as measured by percent light transmission in the conventional way (green filter). On the other hand, an oil produced in accordance with the process of the invention will normally have a clarity of 100. Even if such a residual haze is removed, such as by extended settling, periods etc., the oil being saturated with water at the operating temperature (usually 100–140° F.) will form a haze as soon as it is cooled only slightly (say 5° F.) below such operating temperature. This, of course, is highly undesirable as indicated above. The haze point of the oil product of the invention is usually at least 30° F., and frequently 50 to 60° F., below the temperature of the caustic treatment.

An oil produced in accordance with the process of the invention will usually exhibit a significant improvement in color stability. Gas oils produced in accordance with the process of the invention will normally have an initial A.S.T.M. color not darker than 2½ and usually an A.S.T.M. color close to 1½, depending upon the particular oil source and processing steps. The initial A.S.T.M. color of the oil of the invention will approximate that of conventionally caustic processed oil. Storage of the gas oil produced in accordance with the improved process in a glass bottle at 212° F. for twenty-four hours will normally result in an increase in A.S.T.M. color of only ½ to 1½ units, compared with a similar storage of conventional processed oil which will usually exhibit an increase in A.S.T.M. color of 1 to 2½ units.

The operating conditions of the caustic treating step of the process of the invention need not vary from those conditions normally employed, whether the process be of a recirculation type or a one-pass treatment. The solution strength of the alkali metal hydroxide, which may be either sodium or potassium hydroxide should be in excess of 35% by weight. The treating solution preferably contains the alkali metal hydroxide on a weight percentage in the range of about 35–50%. For a recirculation type treatment, the volume percentage of caustic treating solution is preferably about 5% of the volume of oil. A single-pass caustic treatment will employ a lower volume percent (gauged to the amount of acid oil present) of the caustic treating solution. The temperature of operation is within the range of that normally employed, being preferably about 100 to 150° F. The settling vessel for the caustic-gas oil mixture may be of an electrical precipitator type, although this is not necessary.

Where superdehydration is achieved by subjecting the caustic treated gas oil to the action of a high-voltage unidirectional electrostatic field, the prime requirement of the electrical treater is that it be capable of providing a voltage gradient of at least about 7 kv./inch, the voltage gradient being a value resulting from dividing (a) the voltage applied between spaced electrodes to establish an electric field therebetween by (b) the spacing of the electrodes in inches. A highly efficient electric treater suitable for this use is that shown and described in U.S. Patent No. 2,855,356, Stenzel. Another treater of somewhat different design that may be employed is disclosed in copending application of Stenzel and Turner, Serial No. 64,574, now abandoned. In such a treater the superdehydration is effected during rise of the treated oil along interelectrode spaces between electrodes spaced about 2 to 8 inches and energized from a source of undirectional high-voltage potential sufficient to establish a voltage gradient of at least about 7 kv./inch in the interelectrode space. If superdehydration is achieved by centrifugal force there are numerous centrifuges commercially available capable of providing the high centrifugal force needed for separating the dispersed phase from the caustic treated oil. Either the electrical or centrifugal treatment will reduce the concentration of the dispersed phase in the oil to less than about 10 p.p.m. and frequently to less than 1 p.p.m. This corresponds to values, expressed as NaOH, of 4 and .4 p.p.m.

*Example I*

The oil processed in this example was a light catalytically cracked cycle oil having an API gravity of 28.6°. The oil was treated with a recirculated caustic stream having a strength of 45° Baumé. The caustic treating solution was used in 5% volume of the oil treated and the treatment was carried on at 150° F. The settling vessel employed for the separation of the treating solution and oil was of a conventional electrical precipitator type treating the mixture in a unidirectional electric field of 6 kv./inch. The caustic treated oil from the settling vessel was divided into two portions with a first portion being subjected to a conventional water washing with 5 volume percent of wash water. A second portion of the caustic treated oil was superdehydrated, without water washing, in a cellular electric treater of the type disclosed in copending application supra using unidirectional fields of 16 kv./inch. The oil product produced with the conventional water wash treatment had an aqueous carry over of 0.002%, a clarity (light transmission, percent) of 95 and a sodium carry over of .59 p.p.m. In comparison, the superdehydrated oil product had no detectable aqueous carry over, a clarity of 100, and a sodium carry over of .19 p.p.m.

*Example II*

In this example catalytically cracked cycle oil with an API gravity of 26.5° was treated on a once-through basis with a 45° Baumé caustic solution, there being no recycle of the treating solution. The treating solution was used in a volume percent adequate to supply the sodium hydroxide in an amount approximately equivalent to the acid oils present in the cycle oil. The treatment was carried on at a temperature of 120° F. The caustic-cycle oil mixture was separated in an electric precipitator settling vessel which was supplied with an electrical gradient of 6 kv./inch. The caustic treated gas oil from the electric precipitator settling vessel was divided into a first portion which was water washed in the conventional fashion with a 5 volume percent of water and a second portion of the caustic treated gas oil which was passed to a cellular electrical treater (there being no water addition) of the type disclosed in copending application Serial No. 64,574, Stenzel and Turner. A unidirectional voltage gradient of 8 kv./inch was used in the superdehydrating cellular electrical treater. There was a trace carry over of water in the gas oil product which was water washed and this product exhibited a clarity (light transmission, percent) of 96. The superdehydrated gas oil product had a nil carry over and a clarity of 99. Samples of the untreated raw oil, the water washed caustic treated oil, and the superdehydrated caustic treated oil were subjected to a color stability test which involved holding the samples in glass bottles for 24 hours at 212° F. The raw untreated oil at the end of the accelerated storage test exhibited an A.S.T.M. color of 4, the water washed caustic treated oil an A.S.T.M. color of 4—, and the superdehydrated caustic treated oil an A.S.T.M. color of 2+. The accelerated color stability test of this example clearly illustrates the improved alkyl phenol removal obtainable with the practice of the process of the invention.

*Example III*

A light catalytically cracked cycle oil having an API gravity of 32.2° was mixed with 0.1 volume percent (an amount approximately equivalent to the amount of acid oil present in the oil) of a 50° Baumé caustic solution. This was a one-pass caustic treatment with no recycle. The mixture was passed to an electric precipitator and subjected to treatment in a unidirectional electric field of a gradient of 6 kv./inch where the treated oil was separated from the caustic solution. One portion of the caustic treated oil from the electric precipitator was washed with 7.5 volume percent of water in conventional fashion. A second portion of the caustic treated oil was superdehydrated with no water washing in a cellular electrical treater in a unidirectional electric field of a gradient of 8 kv./inch. The water washed product had a clarity of 94 and an alkyl phenol concentration of 2.7 p.p.m. In comparison, the superdehydrated product had a clarity of 100 and an alkyl phenol concentration of 1.9.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:
1. A process for the alkali treatment of catalytically cracked gas oil boiling in the range of about 425–675° F. to remove acidic organic materials therefrom while avoid- ing hydrolysis of residual salts following separation of the alkali and producing refined products that are bright, of reduced haze point and of improved color stability, which process includes the steps of:

(a) mixing with such catalytically cracked gas oil boiling in such range an amount of strong aqueous solution of alkali metal hydroxide sufficient to react with such acidic organic materials of the oil and form oil-insoluble salts therewith, (b) the strength of said solution being between about 35–50% by weight;

(c) separating said solution and the salts from the oil to produce a body of separated oil made up of a continuous oil phase and a dispersed residual aqueous phase comprising aqueous particles dispersed in the oil, said dispersed aqueous particles containing residual water soluble organic salts resulting from the reaction of said alkali metal hydroxide with said acidic organic materials;

(d) and then directly and intensively dehydrating said separated oil in the absence of hydrolysis of said organic salts to produce a treated oil containing no more than about 10 p.p.m. of aqueous material, said dehydration being effected by subjecting a stream of said separated oil containing residual salts to a high centrifugal force of the order of at least about 850 g's for a time sufficient to separate substantially all the residual aqueous salts and produce said treated oil containing no more than about 10 p.p.m. of aqueous material.

2. A process for the alkali treatment of catalytically cracked gas oil boiling in the range of about 425–675° F. to remove acidic organic materials therefrom while avoiding hydrolysis of residual salts following separation of the alkali and producing refined products that are bright, of reduced haze point and of improved color stability, which process includes the steps of:

(a) mixing with such catalytically cracked gas oil boiling in such range an amount of strong aqueous solution of alkali metal hydroxide sufficient to react with such acidic organic materials of the oil and form oil-insoluble salts therewith, (b) the strength of said solution being between about 35–50% by weight;

(c) separating said solution and the salts from the oil to produce a body of separated oil made up of a continuous oil phase and a dispersed residual aqueous phase comprising aqueous particles dispersed in the oil, said dispersed aqueous particles containing residual water soluble organic salts resulting from the reaction of said alkali metal hydroxide with said acidic organic materials;

(d) and then directly and intensively dehydrating said separated oil in the absence of hydrolysis of said organic salts to produce a treated oil containing no more than about 10 p.p.m. of aqueous material, said intense dehydration being effected by an efficient electric dehydration step comprising subjecting a stream of the separated oil in an interelectrode space to the action of a high-voltage unidirectional electrostatic field of a voltage gradient at least about 7 kv./inch.

3. In a treating process of the type employing a strong aqueous treating solution of an alkali metal hydroxide with the hydroxide constituting 35% or more by weight to remove acidic organic materials from a gas oil fraction, said acidic materials being removed as oil-insoluble alkali metal organic salts in the treating solution, and wherein the treated oil, following separation from the treating solution, is customarily water washed to remove therefrom a dispersed phase of treating solution and dissolved organic salts, the improvement comprising subjecting the treated and separated gas oil to an intense dehydration treatment sufficient to cause the material of the dispersed phase to separate from the oil without use of the customary water wash to obtain an oil product having a haze point at least 30° F. below the temperature of the process, the intense dehydration of the separated gas oil being effected by subjecting same to a centrifugal force of at least about 850–1,000 g's for respective times of at least 30–10 minutes and sufficient to separate substantially all of the dispersed phase material therefrom to produce a treated oil containing less than about 10 p.p.m. residual dispersed phase material.

4. In a treating process of the type employing a strong aqueous treating solution of an alkali metal hydroxide with the hydroxide constituting 35% or more by weight to remove acidic organic materials from a gas oil fraction, said acidic materials being removed as oil-insoluble alkali metal organic salts in the treating solution, and wherein the treated oil, following separation from the treating solution, is customarily water washed to remove therefrom a dispersed phase of treating solution and dissolved organic salts, the improvement comprising subjecting the treated and separated gas oil to an intense dehydration treatment sufficient to cause the material of the dispersed phase to separate from the oil without use of the customary water wash to obtain an oil product having a haze point at least 30° F. below the temperature of the process, the intense dehydration of the separated gas oil being effected by subjecting the separated gas oil while in an interelectrode space to the action of a high-voltage unidirectional electrostatic field of a voltage gradient at least about 7 kv./inch.

References Cited by the Examiner
UNITED STATES PATENTS

| | | | |
|---|---|---|---|
| 2,483,623 | 10/49 | Clayton | 208—187 |
| 2,711,990 | 6/55 | Campbell | 208—263 |
| 2,862,876 | 12/58 | Winberg | 208—187 |
| 3,071,541 | 1/63 | Stenzel | 208—263 |

ALPHONSO D. SULLIVAN, *Primary Examiner.*